(12) United States Patent
Roustaei et al.

(10) Patent No.: US 6,685,095 B2
(45) Date of Patent: Feb. 3, 2004

(54) APPARATUS AND METHOD FOR DECODING DAMAGED OPTICAL CODES

(75) Inventors: Alex Roustaei, La Jolla, CA (US); Wenji Xia, Nepean (CA); Dennis G. Priddy, Clearwater Beach, FL (US)

(73) Assignee: Symagery Microsystems, Inc. (CA)

( * ) Notice: Subject to any disclaimer, the term of this patent is extended or adjusted under 35 U.S.C. 154(b) by 149 days.

(21) Appl. No.: 09/801,111

(22) Filed: Mar. 5, 2001

(65) Prior Publication Data

US 2002/0041712 A1 Apr. 11, 2002

Related U.S. Application Data

(63) Continuation-in-part of application No. 09/628,222, filed on Jul. 28, 2000, now abandoned, and a continuation-in-part of application No. 09/208,284, filed on Dec. 8, 1998, now abandoned, which is a continuation-in-part of application No. 09/073,501, filed on May 5, 1998, now Pat. No. 6,123,261.

(60) Provisional application No. 60/187,223, filed on Mar. 3, 2000.

(51) Int. Cl.[7] .............................................. G06K 07/10
(52) U.S. Cl. .............................. 235/472.01; 235/462.25
(58) Field of Search .......... 235/462.01, 462.02–462.25, 235/462.27–462.48, 471.01–421.03

(56) References Cited

U.S. PATENT DOCUMENTS

| | | | | |
|---|---|---|---|---|
| 5,777,310 A | * | 7/1998 | Liu et al. ................ | 235/462.12 |
| 5,880,451 A | * | 3/1999 | Smith et al. ............. | 235/462.1 |
| 5,895,075 A | * | 4/1999 | Edwards ................... | 283/81 |
| 6,034,379 A | * | 3/2000 | Bunte et al. .............. | 250/566 |
| 6,088,482 A | * | 7/2000 | He et al. .................. | 382/202 |
| 6,097,839 A | * | 8/2000 | Liu .......................... | 382/181 |
| 6,249,008 B1 | * | 6/2001 | Bunte et al. .............. | 250/566 |
| 6,293,466 B1 | * | 9/2001 | Fujita et al. ............ | 235/462.02 |
| 2002/0041712 A1 | * | 4/2002 | Roustaei et al. ......... | 382/199 |
| 2002/0044689 A1 | * | 4/2002 | Roustaei et al. ......... | 382/199 |
| 2002/0153720 A1 | * | 10/2002 | Asay ....................... | 283/103 |

* cited by examiner

*Primary Examiner*—Thien M. Le
(74) *Attorney, Agent, or Firm*—Katten Muchin Zavis Rosenman (57) ABSTRACT

An improved optical code reading system and method that enhances the ability of a reader to locate a symbol within a field of view and enhances the error-correcting properties of the encoding scheme commonly used in 2D bar codes. The reader offsets the effects of damaged finder patterns and missing symbol perimeters and, thereafter, detects high-level symbol information such as the code type, symbol size, and the number of rows and columns in the symbol. The reader then identifies those missing portions of a damaged symbol and marks each missing data bit location with a predetermined indicator. A decoding algorithm then interprets the missing bit indicator as an error of known location (e.g., an "erasure"), thereby nearly doubling the error correcting strength of all bar codes employing the Reed-Solomon error correction scheme.

22 Claims, 3 Drawing Sheets

APPARATUS AND METHOD FOR DECODING DAMAGED OPTICAL CODES

RELATED APPLICATIONS

Priority is claimed from Provisional Application Serial No. 60/187,223, filed Mar. 3, 2000, entitled, "Parallel Processing for Decoding Damaged Finder Patterns" which is incorporated herein by reference in its entirety.

This application is a continuation-in-part of U.S. application Ser. No. 09/628,222, entitled "Optical Scanner and Image Reader for Reading Images and Decoding Optical Information Including One and Two Dimensional Symbologies at Variable Depth of Field," filed Jul. 28, 2000, now abandoned which is incorporated herein by reference in its entirety.

This application is also a continuation-in-part of U.S. application Ser. No. 09/208,284, entitled "Imaging System and Method," filed Dec. 8, 1998, now abandoned, which is a continuation-in-part of U.S. application Ser. No. 09/073,501, filed May 5, 1998, now U.S. Pat. No. 6,123,261, which are incorporated herein by reference in their entireties.

BACKGROUND OF THE INVENTION

Digital imaging technology continues to improve and find widespread acceptance in both consumer and industrial applications. Digital imaging sensors are now commonplace in video movie cameras, security cameras, video teleconference cameras, machine vision cameras and, more recently, hand-held bar code readers. As each application matures, the need for intelligent image processing techniques grows. To date, the large data volume attendant to transmitting a digital image from one location to another could only be accomplished if the two locations were connected by a wired means. Machine vision and imaging-based automatic identification applications required significant computing power to be effective and correspondingly require too much electricity to be useful in portable applications. The trend now in both consumer and industrial markets is toward the use of portable wireless imaging that incorporates automatic identification technology.

Historically, the automatic identification industry has relied on laser technology as the means for reading bar codes. Laser scanners generate a coherent light beam that is oriented by the operator to traverse the horizontal length of the bar code. The reflected intensity of the laser beam is used to extract the width information from the bars and spaces that are encountered. Laser scanners are effective in reading linear bar codes such as the U.P.C. code (found in retail point-of-sale applications), Code 39, Interleaved 2 of 5, or the like. Information stored in these linear (1D) bar codes is used to represent a short message or an index number related to a separate data file located in a central computer.

Imaging-based scanners use a solid-state image sensor such as a Charge Coupled Device (CCD) or a Complimentary Metal Oxide Semiconductor (CMOS) imager to convert an image scene into a collection of electronic signals. The image signals are processed so that any machine-readable character or bar code found in the field of view can be located in the electronic representation of the image and subsequently interpreted. The ability of image-based readers to capture an electronic image of a two-dimensional area for later processing makes them well suited for decoding all forms of machine-readable data at any orientation.

There are a number of advantages realized by using stacked-bar or matrix-type 2D bar codes. Due to the large capacity of 2D codes, an entire data record can be stored in the symbol. This means that instead of referencing a separate central computer data file upon reading the symbol, related information such as unit price, shipping destination, production history or any other user data can be extracted from the symbol itself. 2D bar codes are more compact and take up less label area than 1D codes while storing far more data.

All bar codes contain a number of common components that allow a reader to recognize and decode the symbol correctly. The code reader must be able to locate the code in a field of view, identify the type of bar code, determine the dimensions of the code, and then correctly decode the symbol in the presence of errors.

Linear bar codes and stacked linear bar codes possess a "start bar" pattern and a "stop bar" pattern that serve to identify both the type of bar code and the boundaries of the information. Matrix-type bar codes possess a "finder pattern" that serves the same purpose. Matrix code finder patterns are found either on the perimeter of the code or can be part of the internal structure of the code. Finder patterns typically incorporate additional information that allows the reader to determine code orientation.

Some 2D matrix codes can take on a number of allowed sizes or information densities. These types of codes must include easily detectable information that allows the reader to determine the bar code element size: the minimum height and width of a black or white area or "cell" in the code. Matrix codes typically possess a physical symmetry between the external size and the size of an individual cell. It is possible to determine the number of rows and columns of the matrix by knowing only the length of one side and the size of a single cell. For example, if an object within an image is found to be 100,000 pixels in height and the minimum distance between dark to light transitions is 7,962 pixels, the matrix height in elements can be calculated by dividing 100,000 by 7,962=13 elements high. For codes where only one physical size and information density is allowed, the number of rows and columns are known quantities. Although 2D bar codes are more compact than 1D codes, special care must be taken to ensure that the data stored in the code can be properly extracted. 1D codes provide "information redundancy" in the vertical direction. The taller the 1D codes, the greater the likelihood that a scan line will find and traverse an undamaged portion of the code thereby allowing a successful decode. 2D codes have built-in error detection and "error correction" data to allow the decoder to successfully decode a symbol even if part of the code is damaged or missing.

There are currently a wide variety of 2D codes that are in general use. Each code has a unique way of combining the three basic elements described above. Three of the most commonly used 2D codes include Data Matrix, PDF417, and MaxiCode.

Data Matrix is a matrix-type of 2D bar code that comes in a number of different array sizes and is identifiable by a finder pattern that occupies the perimeter of the optical code. The bottom and left edges of the code are solid black bars, forming an L-shaped pattern. The top and right edges of the code are made up of alternating black and white cells, allowing the reader to determine the number of rows and columns present in the matrix. The Data Matrix standard (ref) defines different types and levels of error correction, the preferred of which is ECC200. ECC200 uses a Reed-Solomon error correction scheme to allow the user to detect and correct a number of damaged bytes. Although most Data Matrix codes have an equal number of rows and columns, the standard allows for rectangular codes where there are twice the number of columns as rows.

PDF417 is a stacked-bar type of 2D bar code. PDF417 codes can be produced at a number of different aspect ratios, but are typically rectangular in shape. The code is identified by a start pattern that occupies the entire left edge of the symbol and a stop pattern occupying the entire right edge of the symbol. Data is stored in rows, with each row encoding the information in one of three schemes. Adjacent rows use different schemes, so the reader can correctly determine which row is being scanned. The code is also divided horizontally into segments. The first and last segment of every row contains Row Indicator data. The Row Indicator data always includes the current row number, and also includes one of the total number of rows in the symbol, the total number of columns in the symbol, or the security level of the symbol. Thus, the first segment of every third row encodes the total number of rows in the symbol, so the decoder can quickly determine how many rows it must detect. This information is also stored in the last segment of the row. PDF417 symbols employ varying levels of Reed-Solomon error correction coding to allow error detection and correction if part of the symbol is damaged or missing.

MaxiCode is a matrix-type code developed by UPS for parcel tracking. MaxiCode symbols have a distinctive 'bulls-eye' finder pattern located at the centre of the symbol. The code elements are hexagonal in shape and are placed on a hexagonal grid 30 elements wide by 33 elements high. The code supports only one size, and one information density, and is approximately 1.12 inches by 1.05 inches. MaxiCode symbols also employ Reed-Solomon error correction encoding to allow errors to be detected and corrected. In a MaxiCode symbol, data can be organized into a primary message and a secondary message. The primary message consists of 50% error control bits to ensure that this data is correctly read even if the secondary message is damaged.

Due to the way that 2D bar codes are generated, there are a number of common problems experienced in attempting to image and decode bar code symbols. Typically, damage to the code occurs along the perimeter of the code. This may be due to destruction of the label on which the code is printed (during shipping or handling, for example), marks made on the code when writing on the label, or other physical damage.

The method by which the code is imaged may also introduce defects to the image that affect the readability of the 2D bar code. Variations in illumination or incorrect exposure, for example, may result in low contrast between black and white marks. This typically occurs at the edges of the code, especially when the code is not printed on a flat surface. Data Matrix codes are especially susceptible to perimeter damage. If portions of the 'L' pattern are missing, decoders may not be able to locate and identify the code. Additionally, missing sections of the alternating black and white marks along the other two sides of the code may prevent the reader from determining the proper array size. MaxiCode symbols generated using a spiral message sequence often have large amounts of damage to the secondary message. Perimeter damage to PDF417 codes will affect the top and bottom rows of data as well as the start and stop patterns. Although these codes include error-correcting schemes, the extra codewords required to be able to correct errors in the data occupy a large amount of the code area. This limits the amount of data that can be stored in a code of a certain size.

Reed-Solomon error correction, now used by almost all 2D bar codes, is a byte-correcting scheme that is widely used for digital storage applications in fields such as telecommunications, for example. Reed-Solomon error correcting codewords are incorporated along with "data" codewords to form an integrated message. Conceptually, one Reed-Solomon error correcting codeword can be used to correct one damaged data codeword if the damage is known in advance. Damaged codewords which are identified in advance are known as "erasures." Two Reed-Solomon codewords are required to correct "unknown" data damage—which is known as an "error." A full discussion of the structure, generation and decoding of Reed-Solomon codes can be found in the references. Briefly, a Reed-Solomon message consists of a number of codewords, consisting of s bits each. The message is n codewords long, with k data codewords and n–k parity codewords. The message is described by the form RS(n,k).

Damage to a Reed-Solomon message is either in the form of errors or erasures. An error occurs when a codeword in an unknown location is damaged or wrong. An erasure occurs when the position of the damaged codeword is known. The measure of the number of errors and erasures that a message can correct is given by 2t=n–k. Reed-Solomon error correcting codewords can correct up to t errors or 2t erasures. Based on this fact, the ability to detect and identify the location of errors in advance can potentially double the effectiveness of the Reed-Solomon encoding, allowing up to 2 times the number of damaged codewords to be corrected.

There have been attempts made in the past to take advantage of this property of Reed-Solomon error-correction. In U.S. Pat. No. 5,533,084, Ackley describes an improved error correction algorithm for use with Code One symbols. Code One is a matrix-type 2D bar code. The invention takes advantage of the specific properties of the Code One symbol to improve the error correction and detection capability of the reader over a standard reader. The algorithm described by Ackley first attempts to decode the symbol assuming there are no errors. If this attempt fails, the reader attempts to decode the symbol again, but this time inserting Code One pad characters over obscured portions of the code. The position and quantity of required pad characters is determined by identifying the position and quantity of existing pad characters and comparing to known symbol size. Ackley's invention adds a significant amount of processing complexity to the scanning portion of the reader but uses standard decoding software to complete the decoding of the corrected, scanned image. The increased scanning complexity results in a greatly increased decoding time.

Thus, there is a need for an optical code reading system that maximizes the error-correcting potential of optical code symbols without sacrificing decoding speed.

SUMMARY OF THE INVENTION

An improved barcode reading system and method is disclosed. There are typically only two reasons why a bar code is not successfully read: 1) it cannot be located within the field of view due to start bar/finder pattern damage or, 2) the physical damage to the symbol exceeds the error correction capability. The instant invention addresses both of these issues. It enhances the ability of a reader to locate a symbol within a field of view and it enhances the error-correcting properties of the encoding scheme commonly used in 2D bar codes. In one embodiment, a global feature determination algorithm is used to offset the effects of damaged finder patterns and missing symbol perimeters. A local feature extraction algorithm is then used to detect high-level symbol information such as the code type, symbol size, and the number of rows and columns in the symbol. The local feature extraction algorithm also identifies those missing portions of a damaged symbol and marks each missing data bit location with a predetermined indicator. A decoding algorithm then interprets the missing bit indicator as an error of known location (e.g., an "erasure"), thereby nearly doubling the error correcting strength of all bar codes employing the Reed-Solomon error correction scheme.

DETAILED DESCRIPTION OF THE INVENTION

Figure 1A:
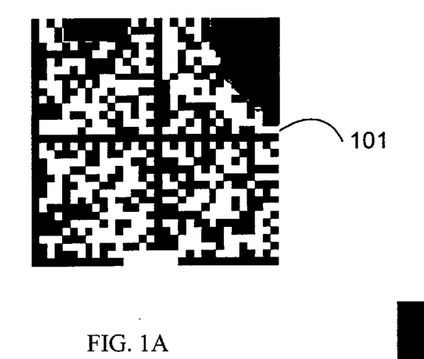
FIG. 1A illustrates an exemplary damaged Data Matrix code symbol.
Figure 1B:
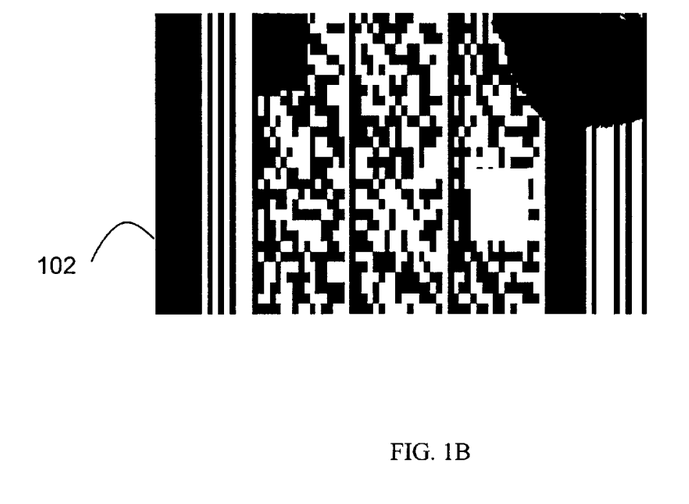
FIG. 1B illustrates an exemplary damaged PDF417 code symbol.
Figure 1C:
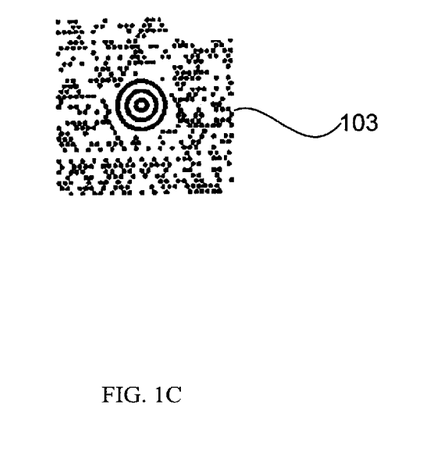
FIG. 1C illustrates an exemplary damaged MaxiCode code symbol.

The invention is described in detail below with reference to the figures wherein like elements are referenced with like numerals throughout. In all imaging-based bar code readers, an image scene is captured by a solid-state sensor. If the scene illumination is not sufficient, or if the bar code to be imaged is not on a flat surface, there may not be enough contrast between the light and dark code elements to distinguish them correctly. FIG. 1A illustrates an example of this effect on a Data Matrix code 101. Another common problem occurs when a solid line overwrites part of a 2D code, for example a PDF417 code 102 as shown in FIG. 1B. If the bar code is printed on a label, the label can become damaged as the object is handled. Label damage most often affects the edges of the code symbol. The effect of label damage on a sample MaxiCode symbol 103 is shown in FIG. 1C. Prior art code readers can tolerate a certain amount of symbol damage by using the error-correcting ability of the codes themselves to achieve a successful decode. The current invention is capable of successfully decoding symbols with up to twice the amount of damage than the prior art readers can successfully decode.

Figure 2:
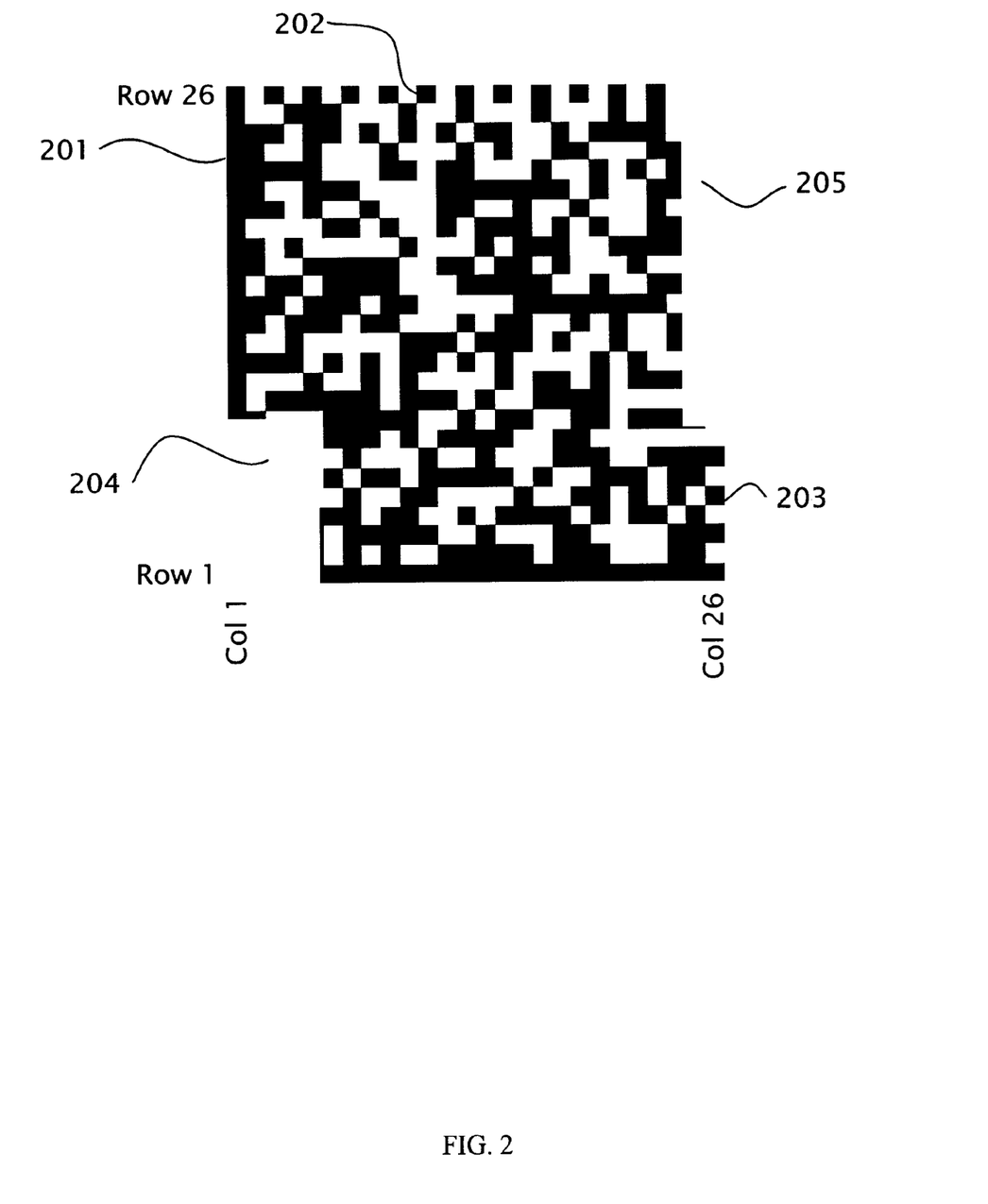
FIG. 2 illustrates a damaged DataMatrix code symbol after a local feature extraction process has been performed, in accordance with one embodiment of the invention.

FIG. 2 shows an exemplary damaged, 26×26 element Data Matrix symbol 201 that can be decoded in accordance with the teachings of the present invention. Once the code symbol 201 is located in the image scene, the boundary of the symbol is traced. In one embodiment, code location and boundary tracing may be implemented as described in a commonly-owned and copending U.S. patent application entitled, "Apparatus and Method for Global and Local Feature Extraction From Digital Images," application Ser. No. 09/801,110, filed concurrently herewith, (referred to herein as the "Global/Local application") and which is incorporated herein by reference in its entirety. The Global/Local application describes how a symbol or code within an image is located using a global feature extraction algorithm, and how the symbol is then identified and traced using a local feature extraction algorithm. However, it is understood that any method of symbol identification and contour tracing can be used in accordance with the present invention, so long as the symbol location, contour and orientation is ultimately determined. By determining the contour of the symbol, the method of the present invention can further calculate or measure the width and height of the symbol.

In one embodiment, after determining the contour of a symbol 201, the code reader of the present invention scans the top edge 202 and right edge 203 of the symbol to determine the number of rows and columns present. Since Data Matrix symbols have alternating dark and light elements along these two edges, the reader can count the number of dark and light elements along an edge to determine the number of rows or columns. Prior art reading devices are unable to obtain a correct count of the number of rows and columns in the matrix, if a region of elements along the top and/or right edges is missing or damaged. In one embodiment of the reader of the present invention, however, the reader uses the intact edge elements to calculate an average element width and height. For example, a "local width" method counts an average width of edge elements. If an edge element is missing or stained, the abnormal width of such element will be discarded if it does not fall within a specified range of widths. Thus, abnormal widths do not effect the calculation of the average element width. For example, the following numbers stand for a width of a respective element and "b" and "w" represent black and white elements, respectively. The width series starts from a first black element as follows:

10(b) 7(w) 8(b) 2(w) 15(b) 8(w) 9(b) 14(w) 3(b) 7(w) 9(b) . . .

By checking the above width series, a stained area is detected between elements 2(w) and 15(b) and a missing area is detected between elements 14(w) and 3(b). Therefore, in the process of calculating an average width, the values 2(w), 15(b), 14(w) and 3(b) are discarded because they are not within a desired range of values. The measured width and height of the symbol is then divided by the average element width and height to calculate the number of rows and columns.

After determining the number of rows and columns, the reader can identify missing or damaged elements along the perimeter of the matrix and label as erasures regions corresponding to the identified missing or damaged elements. Additionally, in one embodiment, after determining the number of rows and columns in the matrix, the reader determines the expected size and dimensions of the L-shaped pattern along the left and bottom edges of the Data Matrix symbol. By determining the expected size and dimensions of the L-shaped pattern, the reader can then identify which portions of the L-shaped finder pattern are missing or damaged. In one embodiment of the invention, the reader marks each data element in the areas determined to be missing or damaged with a predetermined label indicative of an erasure region. As used herein, an "erasure region" refers to an area or region containing at least one element determined to be damaged or missing. In one embodiment, erasure regions are assumed to be rectangular in shape. Under that assumption, the reader marks each of the elements located within the rectangular region in the bottom left corner 204 defined by (row, column) coordinates (1,1); (9,1); (1,5); (9,5), as well as the rectangular region in the top right corner 205 defined by (row, column) coordinates (9,25); (26,25); (9,26); (26,26). In this embodiment, the number of elements marked with the erasure label may be greater than required, thus over-estimating the number of erasures. Another embodiment of the invention involves using the known contour of the region to more precisely define the erased elements.

In one embodiment, after the height and width of the symbol 201 is determined, the reader scans from each edge toward the center of the symbol 201 until at least a portion of an "L"-shaped finder pattern is located. If a minimum portion (e.g., 50%) of a finder pattern is located, the reader assumes that the symbol 201 is a Data Matrix symbol and begins scanning the top and right edges to count the number of rows and columns within the matrix. After determining the number of rows and columns in the symbol 201, missing or damaged elements along the perimeter of the symbol 201 and within the regions corresponding to the expected "L"-shaped pattern are identified and labeled as erasures. Thereafter corresponding erasure regions encompassing the erasures are designated.

Missing or damaged elements (collectively referred to herein as "defective elements" or "defects") of other types of codes (e.g., Maxi Code, PDF417, etc.) may be identified and labeled in a similar fashion. In one embodiment, by locating a known finder pattern for the code, or at least a specified portion of the finder pattern, the reader of the present invention can identify a code type for the code and then scan the code to determine whether known patterns or characteristics of the identified code type exist. If the known pattern or characteristic (collectively referred to herein as "characteristic") is not present at an expected location of the code, the reader then marks a region corresponding to the expected location of the characteristic as an erasure region. Thereafter, Reed-Solomon error correction techniques may be utilized decode the erasure region. The characteristic may be, for example, a known finder pattern, code pattern, or a known size, shape or dimension of the code expected at a certain location or within a certain region of the code.

Figure 3:
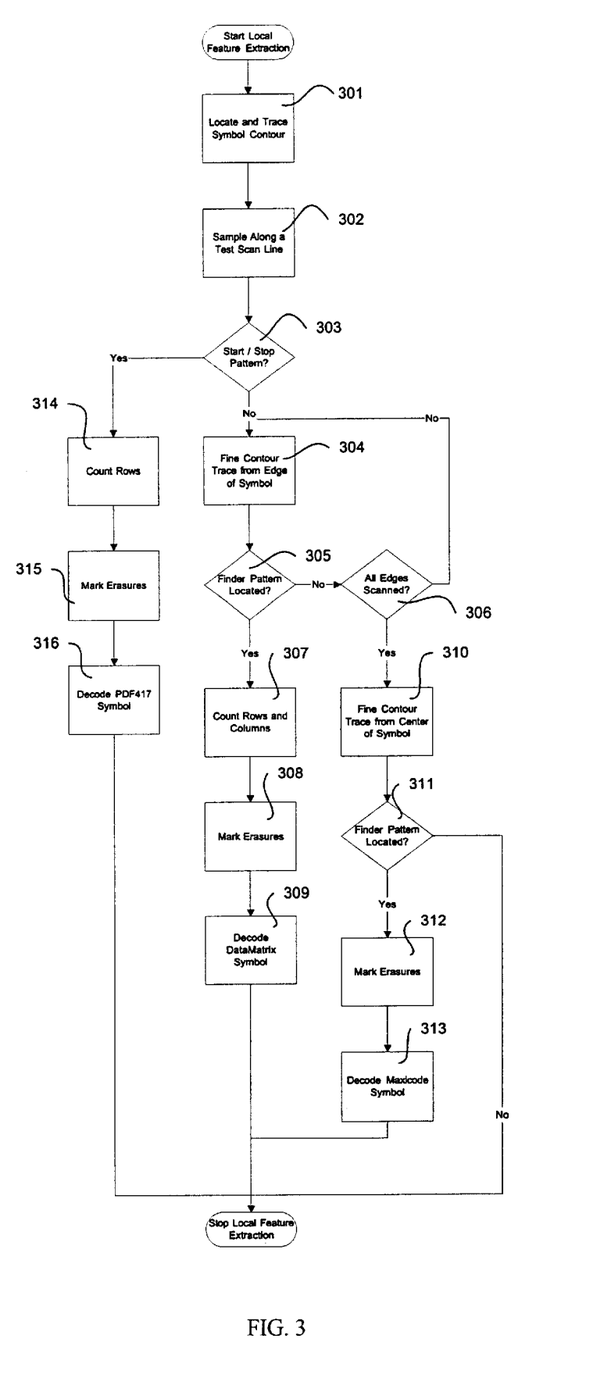
FIG. 3 illustrates a flow chart of a damaged code decoding process in accordance with one embodiment of the invention.

Exemplary steps executed by a reader during a local feature extraction process are illustrated in the flow chart of FIG. 3, in accordance with one embodiment of the invention. As mentioned above, after a global feature extraction algorithm locates all candidate optical codes captured in the field of view, a perimeter of each candidate code is generally outlined forming an outline area. The local feature extraction algorithm then refines each outline area to more precisely define the boundaries of each code. At step 301, the local feature extraction algorithm detects and accurately traces the symbol contour using a chain code algorithm, for example. Such contour-tracing algorithms are well-known in the art. Next, at step 302, the algorithm samples the symbol along a test scan line to determine if a start/stop bar sequence is present. At step 303, the algorithm determines if a start/stop bar sequence has been detected. If no known start/stop bar pattern is present, the symbol is assumed to be a 2D-matrix bar code and the process moves to step 304 where a fine contour trace is executed starting from the left edge of the symbol. At step 305, the algorithm determines if a finder pattern has been located. In one embodiment, if the trace does not detect at least a specified percentage (e.g., 50%) of an "L"-shaped finder pattern indicative of a Data Matrix symbol, for example, the algorithm proceeds to step 306 to determine if all edges of symbol have been scanned. If at step 306 it is determined that all edges of the symbol have not been scanned, the process returns to step 304 and the fine contour trace is repeated, starting from another edge (e.g., the top edge) of the symbol.

If a fragment of a finder pattern is detected at step 305, at step 307, the number of rows and columns contained in the 2-D code is determined by scanning a vertical and a horizontal edge of the 2-D code. At step 308 the erasures within the 2-D code or symbol are marked. In one embodiment, as described above, by determining the number of rows and columns and/or the element size of the Data Matrix symbol, missing or damaged elements along the perimeter and within the regions corresponding to the expected "L"-shaped finder pattern may be identified and labeled. In one embodiment, if a group of damaged or missing elements are identified along one or more edges of the symbol, an erasure region is designated which encompasses those peripheral elements and extends inwardly toward the center of the symbol to potentially encompass missing or damaged elements located closer to the center of the symbol. Because expected element values within the finder pattern and along the perimeter of a Data Matrix symbol are known, the reader of the present invention can detect deviations from those expected values and, thus, identify and mark erasures. Next, at step 309, the contents of the symbol, including black elements, white elements, and identified erasures are decoded using a Data Matrix decode algorithm.

If at step 305, a L-shaped and/or dashed finder pattern are not found and, at step 306, it is determined that all edges of the symbol have been scanned, the algorithm proceeds to step 310 where the fine chain code is executed starting at the center of the symbol in the direction of the left edge. At step 311 it is determined whether a circular finder pattern is detected. If a circle is detected, the symbol is identified as a MaxiCode symbol. MaxiCode is a fixed-size matrix symbology that is made up of offset rows of hexagonal elements arranged around a unique finder pattern (bulls-eye). Hexagonal elements provide fixed center-to-center spacing of all elements for ease of decoding. Typically, each MaxiCode symbol has 884 hexagonal modules arranged in 33 rows that are alternately 30 and 29 elements wide. A minimum one element quite zone surrounds the symbol on all four sides. There are 6 orientation patterns surrounding the central finder pattern. These orientation patterns are made up of three hexagons each. The orientation patterns are located around the central clear space just outside of the "bulls-eye" finder pattern and typically, ordered 60 degrees apart.

The normal size of the MaxiCode symbol is 1.12 inch by 1.05 inch. The central finder pattern and fixed symbol size make the detection of damaged areas possible. Also, as shown in FIG. 1C, Maxicode data elements are physically separated with white delineation or spacing surrounding each element. If a uniformly black area (no separation between black elements) is detected, that area is distinguished by the lack of separation spacing, and marked as an erasure. Because Maxicode is a fixed size format, and because of the central pattern, it is possible to measure outwardly in all four directions to detect bad data. As shown in FIG. 1C, an upper right corner region of the MaxiCode symbol is missing. In one embodiment, this missing corner can be identified by comparing the dimensions obtained from a contour trace of the symbol with expected dimensions of the MaxiCode symbol. After the missing or damage corner is identified, a region encompassing the missing or damaged corner area is marked as an erasure region.

At step 312, erasures within the code are detected and labeled. In one embodiment, this step is performed as follows. A test scan line applied through the middle of the code measures the minimum element width, which is then compared with the external dimensions of the symbol to determine the number of rows and columns that are imaged. By measuring the element width, distortions in symbol size and/or shape are taken into account. If the size of the symbol does not match the expected size based on the number of rows and columns, the symbol is scanned and erasure labels are applied to detected missing areas (e.g., the missing corner area described above). Next, at step 313, the contents of the symbol including labeled erasure regions are decoded using a MaxiCode decode algorithm.

If, at step 303, a known start/stop bar sequence is detected, the code is determined to be either a PDF417 code, identified by its unique start and stop finder patterns, or a 1D bar code. The algorithm then proceeds to step 314 wherein it counts the number of rows in the detected PDF417 or 1D code. In one embodiment, if a PDF417 start and stop pattern is detected, the minimum element width is measured using the start pattern. This minimum element width is then used to determine the width of the first segment of each row since each segment contains a known quantity of elements and spaces. Test scan lines are run in the direction of the code along the first code segment of each row. A large number of parallel scan lines are then used to measure the row height and determine the number of rows. When the pattern between adjacent scan lines changes, a new row is counted. Next, at step 315, erasure areas detected by the parallel scan lines are marked and labeled. In one embodiment, in order to mark erasure areas, an average row height is calculated by averaging the measured height values of at least two rows. The expected number of rows in the code is then calculated by dividing the symbol height by the average row height. The number of counted rows is then compared to the expected number of rows. If there is a discrepancy between the counted number of rows and the expected number of rows, missing or damaged row segments are identified and marked with an erasure label. In one embodiment, any row segment or area which does not fall within a specified range surrounding the average row height calculated above is designated as an erasure region. Finally, at step 316, dark and light areas and those marked with erasure labels are then analyzed with a PDF417 decode algorithm known in the art.

Although three specific bar code types were described in detail (Data Matrix, MaxiCode and PDF417), the disclosed system and method apply to any bar code with a damaged perimeter and all 2D bar codes using Reed-Solomon error-correction or a similar error correction scheme. Those skilled in the art will know, or be able to ascertain using no more than routine experimentation, many equivalents to the specific embodiments of the invention described herein. These equivalents are intended to be encompassed by the following claims.

What is claimed is:

1. A method of decoding a code contained in an image, comprising:
   identifying an area within said image that contains a code;
   tracing a contour of said code;
   locating at least a portion of a finder pattern within the code;
   scanning at least one region of the code to detect a known characteristic of the code;
   labeling at least a portion of said at least one region as an erasure region based on whether said known characteristic is detected; and
   decoding the code.

2. The method of claim 1 wherein said code comprises a 2D Data Matrix code and said step of locating at least a portion of a finder pattern comprises scanning from an edge of the code toward the center of the code until at least a portion of an "L"-shaped finder pattern is located.

3. The method of claim 2 wherein said portion of said "L"-shaped finder pattern comprises 50% of the "L"-shaped finder pattern.

4. The method of claim 2 further comprising:
   measuring a width and height of said Data Matrix code based on said contour of the code;
   scanning a horizontal edge and a vertical edge of said Data Matrix code to calculate an average element width and height, respectively;
   calculating the number of rows and columns in the code by dividing the measured width and height by the average element width and height, respectively; and
   identifying defective elements within said "L"-shaped finder pattern based on expected dimensions of the finder pattern based on the calculated number of rows and columns in the code.

5. The method of claim 1 wherein said code type is a Data Matrix code type and said step of scanning at least one region of the code comprises:
   scanning a horizontal edge of the code to detect alternating light and dark elements located along the horizontal edge;
   measuring a width for each of a plurality of light and dark elements along the horizontal edge;
   calculating an average element width based on at least a subset of the measured widths of said elements along the horizontal edge;
   scanning a vertical edge of the code to detect alternating light and dark elements located along the vertical edge;
   measuring a height for each of a plurality of light and dark elements along the vertical edge;
   calculating an average element height based on at least a subset of the measured heights of said elements along the vertical edge;
   calculating a number of rows in said code by dividing said measured height of the code by said average element height; and
   calculating a number of columns in said Data Matrix code by dividing said measured width of the code by said average element width.

6. The method of claim 5 wherein said characteristic comprises a number of alternating light and dark elements along the horizontal and vertical edges equal to said calculated number of columns and rows, respectively, and wherein said step of labeling said at least one region comprises labeling detected defective elements along said horizontal and vertical edges as erasures.

7. The method of claim 1 wherein said code comprises a MaxiCode symbol and said step of locating a finder pattern comprises scanning from a center region of the symbol outwardly toward an edge until at least a portion of a circular finder pattern is located.

8. The method of claim 7 wherein said step of scanning comprises scanning at least one portion of the code to detect a substantially uniformly black area and said step of labeling comprises labeling the substantially uniformly black area as an erasure region if it is detected.

9. The method of claim 7 wherein said step of scanning comprises:
   applying a scan line through the middle of said code to measure a minimum element width;
   calculating a number of rows and columns in said code based on the minimum element width;
   comparing the calculated number of rows and columns to an expected number of rows and columns; and
   if said calculated number of rows and columns does not match said expected number of rows and columns, scanning said code to identifying defective elements.

10. The method of claim 1 wherein said code is a PDF417 code and wherein said step of locating at least a portion of a finder pattern comprises:
    scanning at least a portion of the code to detect a start bar sequence;
    determining a minimum element width based on the start bar sequence; and determining a width of a row segment based on the minimum element width.

11. The method of claim 1 wherein:

said step of scanning comprises:
applying a plurality of parallel scan lines across said code to detect a number of rows within the code;
measuring a height for a first segment of each detected row; and said step of labeling comprises labeling as an erasure region any row segments having a measured height not within a predetermined height range.

12. A method of decoding a code contained in an image, comprising:

identifying an area within said image that contains a code;
tracing a contour of said code;
locating at least one portion of a finder pattern within the code;
determining a code type for said code based on said at least one portion of said finder pattern;
scanning at least one region of the code to detect a known characteristic of the code type;
labeling at least a portion of said at least one region as an erasure region based on whether said known characteristic is detected; and
decoding the code.

13. The method of claim 12 wherein if it is determined that said code type is a DataMatrix code, said step of locating at least a portion of a finder pattern comprises scanning from an edge of the code toward the center of the code until at least a portion of an "L"-shaped finder pattern is located.

14. The method of claim 13 wherein said portion of said "L"-shaped finder pattern comprises 50% of the "L"-shaped finder pattern.

15. The method of claim 13 further comprising:

measuring a width and height of said Data Matrix code based on said contour of the code;
scanning a horizontal edge and a vertical edge of said Data Matrix code to calculate an average element width and height, respectively;
calculating the number of rows and columns in the code by dividing the measured width and height by the average element width and height, respectively; and
identifying defective elements within said "L"-shaped finder pattern based on expected dimensions of the finder pattern determined from the calculated number of rows and columns in the code.

16. The method of claim 12 wherein if said code type is determined to be a DataMatrix code, said step of scanning at least one region of the code comprises:

scanning a horizontal edge of the code to detect alternating light and dark elements located along the horizontal edge;
measuring a width for each of a plurality of light and dark elements along the horizontal edge;
calculating an average element width based on at least a subset of the measured widths of said elements along the horizontal edge;
scanning a vertical edge of the code to detect alternating light and dark elements located along the vertical edge;
measuring a height for each of a plurality of light and dark elements along the vertical edge;
calculating an average element height based on at least a subset of the measured heights of said elements along the vertical edge;
calculating a number of rows in said code by dividing said measured height of the code by said average element height; and
calculating a number of columns in said Data Matrix code by dividing said measured width of the code by said average element width.

17. The method of claim 16 wherein said characteristic comprises a number of alternating light and dark elements along the horizontal and vertical edges equal to said calculated number of columns and rows, respectively, and wherein said step of labeling said at least one region comprises labeling detected defective elements along said horizontal and vertical edges as erasures.

18. The method of claim 12 wherein if said code type is determined to be a MaxiCode symbol, said step of locating a finder pattern comprises scanning from a center region of the symbol outwardly toward an edge until at least a portion of a circular finder pattern is located.

19. The method of claim 18 wherein said step of scanning comprises scanning at least one portion of the code to detect a substantially uniformly black area and said step of labeling comprises labeling the substantially uniformly black area as an erasure region if it is detected.

20. The method of claim 19 wherein said step of scanning comprises:

applying a scan line through the middle of the said code to measure a minimum element width;
calculating a number of rows and columns in said code based on the minimum element width;
comparing the calculated number of rows and columns to an expected number of rows and columns; and
if said calculated number of rows and columns does not match said expected number of rows and columns, scanning said code to identifying defective elements.

21. The method of claim 12 wherein if said code type is determined to be a PDF417 code, said step of locating at least a portion of a finder pattern comprises:

scanning at least a portion of the code to detect a start bar sequence;
determining a minimum element width based on the start bar sequence; and
determining a width of a row segment based on the minimum element width.

22. The method of claim 21 wherein:

said step of scanning comprises:
applying a plurality of parallel scan lines across said code to detect a number of rows within the code;
measuring a height for a first segment of each detected row; and said step of labeling comprises labeling as an erasure region any row segments having a measured height not within a predetermined height range.

* * * * *

UNITED STATES PATENT AND TRADEMARK OFFICE
CERTIFICATE OF CORRECTION

PATENT NO. : 6,685,095 B2
DATED : February 3, 2004
INVENTOR(S) : Roustaei et al.

It is certified that error appears in the above-identified patent and that said Letters Patent is hereby corrected as shown below:

<u>Title page,</u>
Item [75], "Wenji Xia" should read -- Wenjie Xia --

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,685,095 B2
APPLICATION NO. : 09/801111
DATED : February 3, 2004
INVENTOR(S) : Alexander Roustaei et al.

It is certified that error appears in the above-identified patent and that said Letters Patent is hereby corrected as shown below:

Item (63)
On the Title page, in the related U.S. Application Data, "Continuation-in part of application No. 09/628,222, filed on Jul. 28, 2000, now abandoned, and a continuation-in-part of U.S. application No. 09/208,284, filed on Dec. 8, 1998, now abandoned, which is a continuation-in-part of U.S. application No. 09/073,501, filed on May 5, 1998, now U.S. Pat No. 6,123,261." should read --Continuation-in-part of application No. 09/628,222, filed on Jul. 28, 2000, now abandoned.--

Column 1, lines 17-22 "This application is also a continuation-in-part of U.S. application Ser. No. 09/208,284, entitled "Imaging System and Method," filed Dec. 8, 1998, now abandoned, which is a continuation-in-part of U.S. application Ser. No. 09/073,501, filed May 5, 1998, now U.S. Pat. No. 6,123,261, which are incorporated herein by reference in their entireties" should be deleted.

Column 8, line 51 "damage" should read --damaged--.

Claim 20, Column 12, line 42 "identifying" should read --identify--.

Signed and Sealed this

Twenty-sixth Day of September, 2006

JON W. DUDAS
*Director of the United States Patent and Trademark Office*